(12) United States Patent
Yamauchi et al.

(10) Patent No.: US 7,887,946 B2
(45) Date of Patent: Feb. 15, 2011

(54) PRISMATIC BATTERY HAVING A WELDING WINDOW

(75) Inventors: Yasuhiro Yamauchi, Sumoto (JP); Kenji Nansaka, Itano-gun (JP); Naoya Nakanishi, Tokushima (JP); Toshiyuki Nohma, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1090 days.

(21) Appl. No.: 11/601,798

(22) Filed: Nov. 20, 2006

(65) Prior Publication Data

US 2007/0117009 A1    May 24, 2007

(30) Foreign Application Priority Data

Nov. 24, 2005    (JP) .............................. 2005-338120

(51) Int. Cl.
*H01M 6/42* (2006.01)
*H01M 6/46* (2006.01)

(52) U.S. Cl. ...................... 429/160; 429/152
(58) Field of Classification Search ................. 429/160, 429/152, 149
See application file for complete search history.

(56) References Cited

U.S. PATENT DOCUMENTS 6,440,604 B1 * 8/2002 Inoue et al. .................. 429/211

2003/0129479 A1 * 7/2003 Munenaga et al. ............ 429/94

FOREIGN PATENT DOCUMENTS

JP      10-261441 A      9/1998
JP      2000-200594 A      7/2000

* cited by examiner

*Primary Examiner*—Dah-Wei D Yuan
*Assistant Examiner*—Stephan Essex
(74) *Attorney, Agent, or Firm*—Westerman, Hattori, Daniels & Adrian, LLP

(57) ABSTRACT

A prismatic battery according to one embodiment of the present invention includes a flat electrode group 10 stacked or rolled by mutually positive and negative electrodes with a separator therebetween, a pressing plate 13A, a current collecting body 18A or 18B and a plurality of exposed sections 16, at least one end of the positive and negative electrodes substrates in a width direction being uncoated with a positive or negative electrode mixture. The pressing plate 13A is welded to the exposed sections 16. The pressing plate 13A includes opposing surfaces with a space therebetween provided by folding back a metal plate, and includes a slit 15 along a folded back section at least to one of the opposing surface's side. The exposed sections 16 are inserted into a gap of the pressing plate 13A, and the exposed sections 16 and the pressing plate 13A are welded by a high energy beam from a transverse direction through the slit 15. This provides a prismatic battery for large current application in electric vehicles and hybrid electric vehicles.

1 Claim, 13 Drawing Sheets

FIG.1
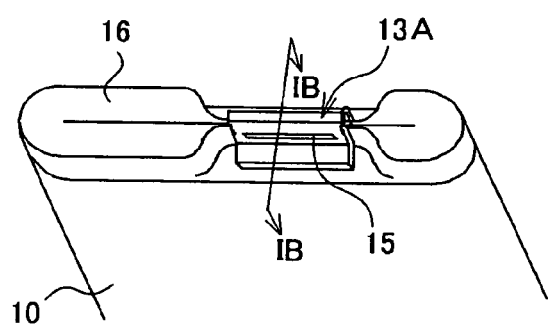
FIG. 1A
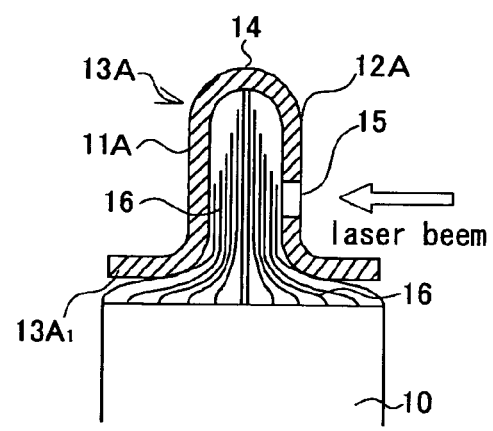
FIG. 1B

FIG.2
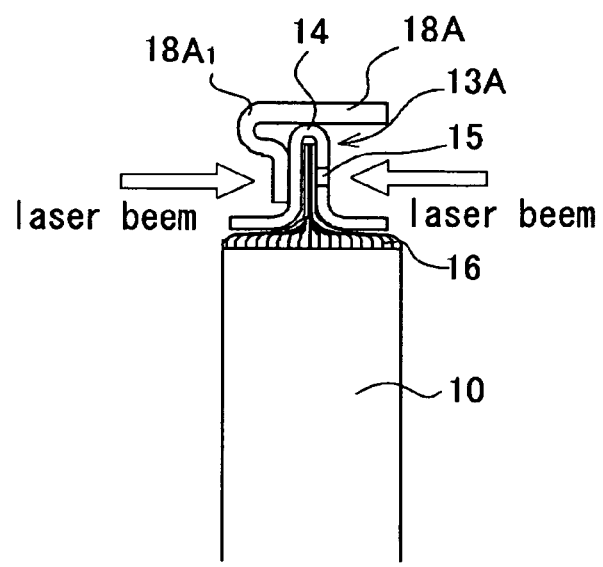
FIG. 2A
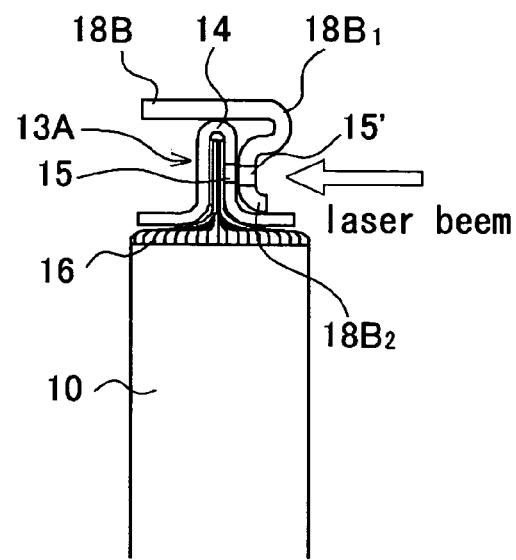
FIG. 2B

FIG.4
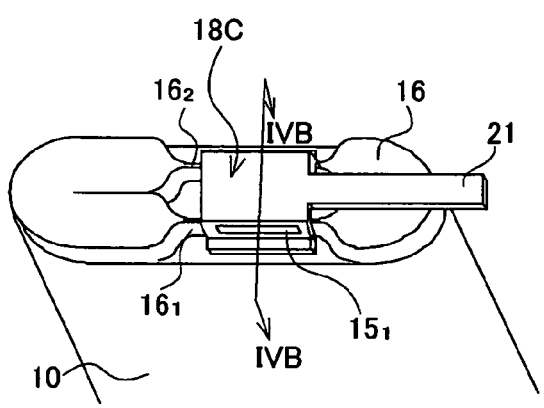
FIG. 4A
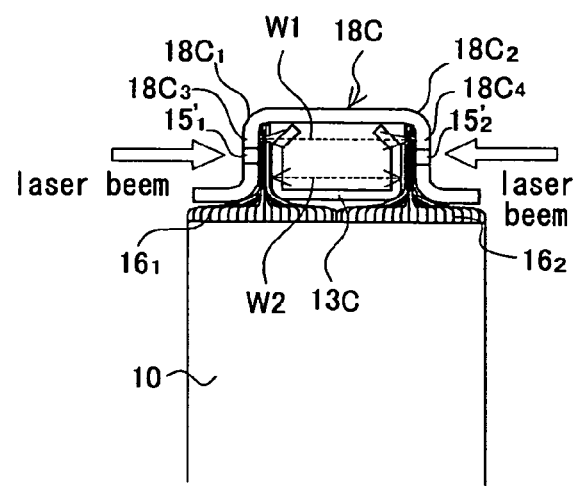
FIG. 4B

FIG.6
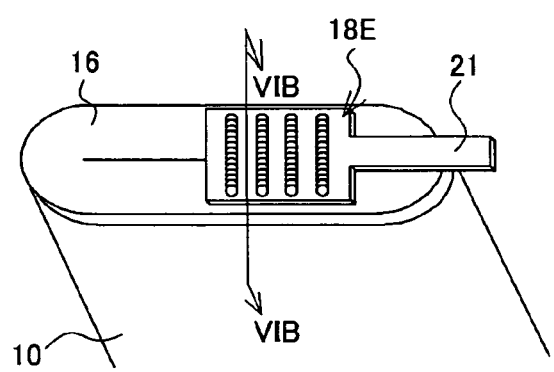
FIG. 6A
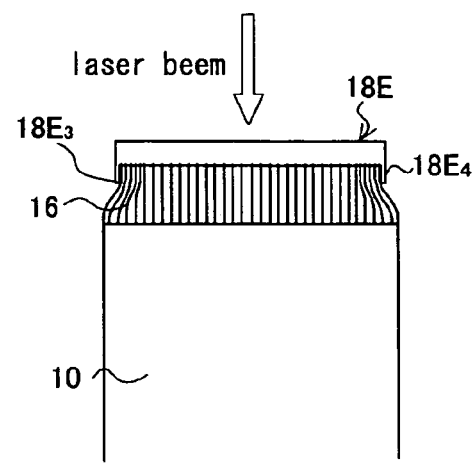
FIG. 6B

PRIOR ART
FIG.13
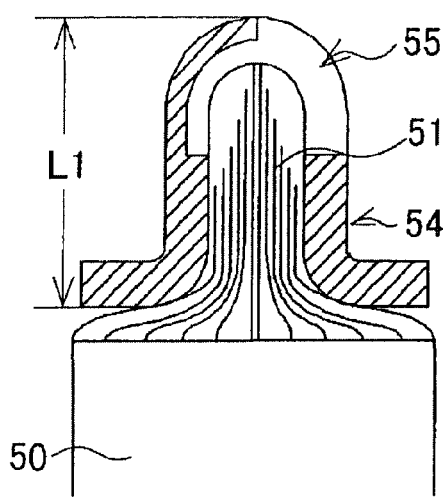
FIG. 13A
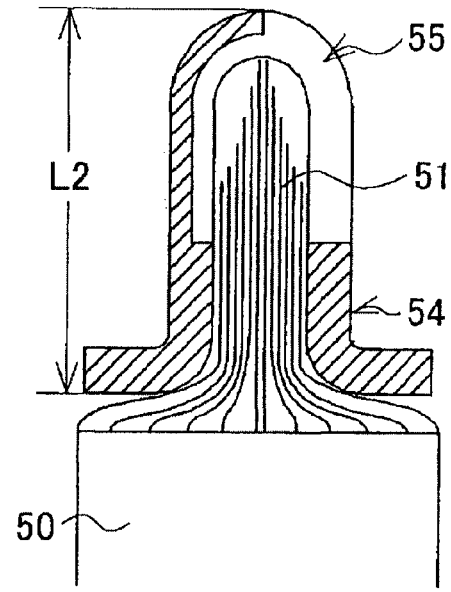
FIG. 13B

PRISMATIC BATTERY HAVING A WELDING WINDOW

FIELD OF THE INVENTION

The present invention relates to a prismatic battery having a rolled electrode composed of strips of positive and negative electrodes rolled with a strip separator interposed therebetween. More particularly, the present invention relates to a prismatic battery used for large current applications in electric vehicles, hybrid electric vehicles and the like.

BACKGROUND OF THE INVENTION

Against a background of intensifying movements for environmental protection, regulations on emissions of carbon dioxide and similar gases have been tightened. In the automobile world, development of electric vehicles (EVs) and hybrid electric vehicles (HEVs) is being vigorously pursued in addition to vehicles using gasoline, diesel oil, natural gas and other fossil fuels. Furthermore, the soaring rise in the price of fossil fuels over recent years has given a boost to the development of EVs and HEVs.

For such EVs and HEVs, nickel-hydrogen secondary batteries and lithium ion secondary batteries are commonly used. Vehicles are now required not only to be environmentally friendly, but also to have high-level basic performance, that is, driving ability as automobiles. In order to raise the driving capability to high levels, it is necessary not merely to make the battery capacity larger but to make the battery output larger, since this has a major effect on the automobile's acceleration performance and climbing performance. However, when high-output discharge is performed, large current flows in the battery, and as a result, the heat generated by the contacting resistance between the battery's substrate and current collecting body becomes large. Thus, batteries for EVs and HEVs are required not only to be large-size and large-capacity, but also to be able to produce large current. Consequently, in order to prevent power loss inside the batteries and reduce heat generation, various improvements have been implemented concerning preventing poor welding between the battery's substrate and current collecting body, and thus lowering the internal resistance (refer to JP-10-261441-A (claims, paragraphs 0011 to 0014, FIGS. 8 to 10) and JP-2000-200594-A (paragraphs 0002 to 0007, 0018 to 0021, FIGS. 1, 2, 3, 8, 9)).

Generally, nickel-hydrogen secondary batteries and lithium ion secondary batteries for EVs and HEVs have a rolled electrode in an elongated cylindrical shape composed of strips of positive and negative electrodes rolled with a strip separator interposed therebetween. Taking the lithium ion secondary battery as an example, negative electrode active materials such as graphite coated to a surface excluding an upper end of a thin strip of copper foil, which is a negative electrode substrate, is used for a negative electrode, positive active materials such as lithium cobalt complex oxide coated to a surface excluding a lower end of a thin strip of aluminum foil, which is a positive electrode substrate, is used for a positive electrode. These negative and positive electrodes form a rolled electrode by shifting up and down a little while rolling, so that an upper end exposing the negative electrode substrate is protruded from above, and a lower end exposing the positive electrode substrate is protruded from below.

A current collecting body welded to negative and positive electrode substrates at an uncoated side is formed with a slit. Each edge of the substrates at the uncoated side is inserted into the slit and this area is irradiated by a laser, thereby laser-welding each edge of the substrates at the uncoated side and the current collecting body (refer to JP-10-261441-A and JP-2000-200594-A). This method enables reliable welding of an edge of the substrates at an uncoated side of an electrode and a current collecting body, thereby reducing internal resistance of a battery, and enabling a battery to be obtained with reduced variation of resistance.

The connection between an edge of substrates at an uncoated side of the electrode and a current collecting body disclosed in JP-10-261441-A will now be described with reference to FIGS. 7 and 8. FIG. 7 is a perspective view of a current collecting body used for a battery disclosed in JP-10-261441-A. FIG. 8 is a schematic plan view of laser welding after mounting a current collecting body to an edge of substrates at an uncoated side to a current collecting body of FIG. 7. This current collecting body 40 is made of the same material as the substrates of an electrode plate, having a thickness of 5 mm, and a gap between slits 41 of 0.2 mm. At a surface side, an edge of the current collecting body protrudes by 0.5 mm from the outer surface of each slit 41. An undersurface side is provided with an insertion groove 42 which is in communication with the slit 41 at which a plurality of substrate edges are inserted bundled together.

The negative electrode side of the current collecting body 40 with such features, for example, as shown in FIG. 8, is mounted to a rolled electrode 45 so as an edge 44 of a plurality of substrates is protruded from the slit 41 of a current collecting body $40_1$ at a negative electrode 43 side. Along the edge 44 of the substrates protruded from the slit 41 of the current collecting body $40_1$, the outer surface of the slit 41 section of the current collecting body $40_1$ and the edge 44 of the substrates are laser welded by tilting a light axis of a laser beam 46 by $\theta=15°$ from the welding surface.

Next, the connection between substrate edges at an uncoated side of an electrode and the current collecting body disclosed in JP-2000-200594-A will be described with reference to FIGS. 9 through 12. FIG. 9 is a perspective view showing the state in which a current collecting body is mounted to a rolled electrode of a battery disclosed in JP-2000-200594-A. FIG. 10 is a partially enlarged perspective view of the current collecting body of FIG. 9. FIG. 11 is an enlarged sectional view before the substrate edges are bent at an uncoated side of an electrode inserted into a slit of the current collecting body of FIG. 9. FIG. 12 is an enlarged sectional view after the substrate edges are bent at an uncoated side of an electrode inserted into a slit of the current collecting body of FIG. 9.

A rolled electrode body 50 of a battery disclosed in JP-2000-200594-A is connected with a current collecting body 52 of a negative electrode 51 and a current collecting body (not shown) of a positive electrode 53. The current collecting body 52 of the negative electrode 51 is a copper alloy plate covering above a straight section in a central portion and one side of a curved section of the rolled electrode body 50 in an elongated cylindrical shape. A pinching section 54 is provided at the area above one side of the straight section, created by folding the copper alloy plate to have an inverted U-shaped profile. Each pinching section 54 has a window section 55 making a gap by grinding a part of the folded copper alloy plate except for the both ends of its top end. Further, at the area covering above the curved section of the elongated cylindrical shape of the rolled electrode 50, a lower end of a negative electrode terminal 56 made of a copper alloy is connected. A current collecting body of the positive electrode 53 is made of an aluminum alloy plate (not shown) covering above, the sides, and lower side of the straight section in the center, and above the other curved section of the elongated cylindrical shape of the rolled electrode 50. At the tip of the straight section on the lower side, a pinching section is provided that is formed in the same manner as the pinching section 54 of the current collecting body 52 of the negative electrode 51, created by folding the aluminum alloy plate to have an inverted U-shaped profile.

The window section 55 of the pinching section 54 of the battery disclosed in JP-2000-200594-A is deeper than the related art, and is grinded by leaving a pressing plate piece 58 protruded upward from one of the opposite sides of the copper alloy plate of the pinching sections 54. Further, the pressing plate piece 58 shown in FIG. 12 is in a squashed state (this process is described later). The pressing plate piece 58 has a thinner plate thickness than one of the opposite sides of the copper alloy plate of the pinching sections 54, and is grinded into a plate-form at a width to have a gap at both ends of the window section 55. In the gap of the pinching section 54 of the negative electrode current collecting body 52 stated above, as shown in FIG. 11, a plurality of substrates at an upper end of the negative electrode 51 of the rolled electrode 50 are pinched together, so as a tip is fully protruded to the deeply grinded window section 55. In this way, the tip of copper foil of the negative electrode 51 protruded to the window section 55, as shown in FIG. 12, is curved towards an opposing direction from the side that the pressing plate piece 58 is protruded, by pressing the pressing plate piece 58 from obliquely above, so that the substrates of the negative electrode 51 curved at the end of the pressing plate piece 58 is fixed so as to be pressed down. Accordingly, the tip of the substrates of the negative electrode 51 which is pressed down at the tip of the pressing plate piece 58 is connected to the surrounding copper alloy plate by laser welding. The pinching section of a positive electrode current collecting body of a battery disclosed in JP-2000-200594-A has similar features to the current collecting body of the negative electrode.

According to the features disclosed in JP-2000-200594-A, for example, the substrates at an upper end of the negative electrode 51 protruded from the window section 55 of the pinching section 54 of the negative electrode current collecting body 52 have an end that is fixed in a bent manner, making it difficult for these substrates to come loose from the pinching section 54, even if the substrate tip is not properly welded or even if disconnected. Further, an excessive force will not be applied onto the welded tip of these substrates, as the substrates at the upper end of the negative electrode 51 are firmly pinched to the pinching section 54 as above, making it difficult for the weld to disconnect. Therefore, even if the battery is mounted on an electric vehicle and the like and receives vibration and impact repeatedly, the connection between the negative electrode 51 and the negative electrode current collecting body 52, and the positive electrode 53 and the positive electrode current collecting body of the rolled electrode 50 is not at risk of easy disconnection, thereby preventing deterioration of battery performance.

According to the examples of the related art as described above, the substrates of the negative and positive electrodes and the current collecting body are connected by laser welding, thereby reducing internal resistance of a battery, whereby a battery can be obtained with reduced variation of resistance. However, the structure with the slit 41 of the current collecting body 40 shown in FIGS. 7 and 8 of JP-10-261441-A includes substrates 44, for example, formed with a number of copper foils at an upper end of the negative electrode 43. As the upper end is only laser welded in a state that the substrates 44 are bundled and pinched in the slit 41 of the negative electrode current collecting body 40, thereby causing problems such as the laser welding becoming incomplete and easily disconnected. When the laser-welded area disconnects, the thin substrates 44 of the negative electrode 43 are pinched by the slit 44 overlapping with a number of other substrates 44 of the negative electrode 43. Accordingly, when subjected to vibration and impact, there is a possibility of some substrates coming loose. Also when even only one substrate 44 of the negative electrode 43 comes loose from the slit 41, the pinching force against the rest of the substrates 44 of the negative electrode 43 becomes weak, thereby causing a problem that these substrates 44 are also apt to come loose.

In the connection disclosed in JP-10-261441-A, a possibility of internal short-circuit arises because laser beam is irradiated from above the bundled substrates 44, whereby sputtered fine particles can infiltrate the rolled electrode during the irradiation of laser beam.

The pinching section 54 of the battery disclosed in JP-2000-200594-A is deeper than the related art, and grinded by leaving a pressing plate piece 58 protruded upward from one of the opposite sides of the copper alloy plate of the pinching section 54. Consequently, the substrates at an upper end of the negative electrode 51 of the rolled electrode 50 are gathered in plurality and pinched so as the tip is fully protruded to the window section 55 deeply grinded in the pinching section 54. However, the length of the substrates at the upper end of the negative electrode 51 is generally assumed to be fixed, thereby causing a difference in distance to the tip of the substrates of the negative electrode 51 pinched within the pinching section 54, corresponding to the thickness of the rolled electrode 50. As a result, they will not be in a uniform height as shown in FIG. 11, but as shown in FIG. 13A, the center is the highest, and becomes shorter towards both ends in the pinching section 54.

Therefore, when the height L1 of the pinching section 54 is short, as shown in FIG. 13A, there is a possibility that some of the substrates at the upper end of the negative electrode 51 do not reach the window section 55. The problem may be solved, as shown in FIG. 13B, by raising the height L2 of the pinching section 54, enlarging the partially grinded window section 55, and increasing substrate margins of the negative electrode 51 being exposed. But when such features are adopted, the space that the rolled electrode occupies within a battery package decreases, thereby causing a problem of reduced battery capacity.

The pinching section 54 of the electrode disclosed in JP-2000-200594-A, at least at both sides of the pressing plate piece 58, is in a state that the substrates at the upper end of the gathered negative electrode 51 are exposed upward from the window section 55 as is disclosed in JP-10-261441-A. Accordingly, when the substrates at the upper end of the negative electrode 51 and the pinching section 54 are laser-welded at an area that the pressing plate piece 58 of the pinching section 54 does not exist, a possibility of internal short-circuit by sputtered fine particles arises, as is disclosed in JP-10-261441-A.

SUMMARY OF THE INVENTION

In consideration of the problems in the related art stated above, the present invention provides a prismatic battery with features of reducing a possibility of internal short-circuit caused by sputtered fine particles infiltrating an electrode while welding exposed substrates of an electrode to a pressing plate or a current collecting body using a high energy beam such as laser beam, and to be able to firmly weld the exposed substrates to the pressure plate or the current collecting body, even if the length of the exposed substrates of the electrode is short.

According to a first embodiment of the present invention, a prismatic battery includes an electrode group in a flat form stacked or rolled by a positive electrode coated with a positive electrode mixture to a positive electrode substrate and a negative electrode coated with a negative electrode mixture to a negative substrate with respect to each other with a separator therebetween; a pressing plate; and a current collecting body electrically connected to the pressing plate. An end in a width direction of at least one of the positive electrode substrate and the negative electrode substrate has a plurality of exposed sections which are uncoated with the positive electrode mixture or the negative electrode mixture. The pressing plate is welded to the plurality of exposed sections.

The pressing plate forms opposing surfaces with a space therebetween by folding back a metal plate, and is provided with a slit along a folded back section at least to one side of the opposing surfaces.

The plurality of exposed sections are inserted into the gap of the pressing plate, and the plurality of exposed sections and the pressing plate are welded by a high energy beam from a transverse direction through the slit.

According to a second embodiment of the present invention, in the prismatic battery of the first embodiment, the current collecting body includes a metal fitting having an inverted L-shaped cross section and a connecting section directly extended in a strip form from the metal fitting. The current collecting body has an inside surface of the inverted L-shaped metal fitting positioned so as to abut one of the opposing surfaces of the pressing plate, and the folded back section. The current collecting body has an area abutting one of the opposing surfaces of the pressing plate of the inverted L-shaped metal fitting welded by a high energy beam from a transverse direction.

According to a third embodiment of the present invention, in the prismatic battery of the second embodiment the current collecting body having a section abutting one of the opposing surfaces of the pressing plate of the inverted L-shaped metal fitting is provided with a slit at a position overlapping with another slit provided at the pressing plate. The plurality of exposed sections, the pressing plate and the inverted L-shaped metal fitting of the current collecting body are welded by a high energy beam from a transverse direction through the respective slits provided to the pressing plate and the inverted L-shaped metal fitting of the current collecting body.

According to a fourth embodiment of the present invention, in the prismatic battery of any of the first through third embodiments, the high energy beam is formed with a laser beam or an electron beam.

According to a fifth embodiment of the present invention, a prismatic battery includes an electrode group in a flat form stacked or rolled by a positive electrode coated with a positive electrode mixture to a positive electrode substrate, and a negative electrode coated with a negative electrode mixture to a negative electrode substrate with respect to each other with a separator therebetween; and a current collecting body. An end in a width direction of at least one of the positive electrode substrate and the negative electrode substrate has a plurality of exposed sections which are uncoated with the positive electrode mixture or the negative electrode mixture. The pressing plate is welded to the plurality of exposed sections.

The current collecting body includes opposing surfaces with a space therebetween by folding back a metal plate in a bracket shape and a surface connecting between the opposing surfaces, a slit along the folded back section to the respective opposing surfaces, and a section directly extended in a strip form from the surface connecting the opposing surface.

The plurality of exposed sections are divided into two pairs and inserted into the gap between the opposing surfaces of the current collecting body with the pressing plate disposed between the pairs of the exposed sections.

The pairs of the exposed sections, the pressing plate, and the opposing surfaces of the current collecting body are welded by a high energy beam from a transverse direction through the slits provided at the opposing surfaces of the current collecting body.

According to a sixth embodiment of the present invention, in the prismatic battery of the fifth embodiment the pressing plate is formed with opposing surfaces with a space therebetween by folding back a metal plate in a bracket shape, and an outside of the opposing surfaces of the pressing plate are inserted into the gap of the current collecting body in a state connected to the exposed section.

According to a seventh embodiment of the present invention, in the prismatic battery of any of the fifth or sixth embodiment, the high energy beam is formed with a laser beam or an electron beam.

According to an eighth embodiment of the present invention, a prismatic battery includes an electrode group in a flat form stacked or rolled by a positive electrode coated with a positive electrode mixture to a positive electrode substrate and a negative electrode coated with a negative electrode mixture to a negative electrode substrate with respect to each other with a separator therebetween; and a current collecting body, an end in a width direction of at least one of the positive electrode substrate and the negative electrode substrate having a plurality of exposed sections which are uncoated with the positive electrode mixture or the negative electrode mixture. The pressing plate is welded to the plurality of exposed sections.

The current collecting body includes opposing surfaces with a space therebetween by folding back a metal plate in a bracket shape and a surface connecting between the opposing surfaces, a slit along the folded back section to the respective opposing surfaces, and a connecting section directly extended in a strip form from the surface connecting between the opposing surfaces.

The pressing plate includes two pressing sections forming opposing surfaces with a space therebetween by folding back a metal plate and integrally formed in parallel and spaced with a predetermined gap therebetween, and provides the slit along the folded back section to a respective surface positioned outside of the two pressing section with each other.

The plurality of exposed sections are divided into two pairs each of which is inserted into a space between the opposing surfaces of the current collecting body in a state that each pair of the exposed sections is inserted into a gap of the two pressing sections.

The pairs of the exposed sections, the pressing plate, and the respective opposing surfaces of the current collecting body are welded by a high energy beam from a transverse direction through a slit respectively provided at the opposing surfaces of the current collecting body and the slit respectively provided at the surface positioned outside of the pressing plate.

According to a ninth embodiment of the present invention, in the prismatic battery of the eighth embodiment, the high energy beam is formed with a laser beam or an electron beam.

By providing the features stated above, the present invention offers beneficial advantages as hereinafter described. In other words, according to the first embodiment of the present invention, a pressing plate is formed with surfaces opposing each other and spaced apart by folding back a metal plate, and provided with a slit along a folded back section at least to one side of the opposing surfaces, whereby an exposed section of the positive electrode substrates or negative electrode substrates inserted into a gap of the pressing plate is welded by a high energy beam from a transverse direction. Accordingly, sputtered fine particles are dispersed in a traveling direction of the high energy beam; i.e., in a horizontal direction, so that they will not infiltrate an electrode group, thereby enabling a prismatic battery to be obtained with less possibility of internal short-circuit. In addition, in a case—that the welding energy of a high energy beam is too great, there is only a slight chance of damage being caused to the electrode group of the prismatic battery.

Further, a plurality of exposed sections of positive electrode substrates or negative electrode substrates inserted into a gap of a pressing plate have a fixed exposed substrate margin, thereby generating a difference in distance to the tip of these substrates corresponding to a thickness of an electrode group in a flat form. As a result, the center of the pressing plate extends to the highest position and becomes shorter towards both ends. However, according to the first embodiment of the present invention, the pressing plate is formed with surfaces opposing each other and spaced apart by folding back a metal plate and is provided with a slit along a folded back section at least to one side of the opposing surfaces. As the position that the slit is provided at the pressing plate, in other words, the welded section, is closer to the base of the exposed section compared to the related art, a prismatic battery can be obtained in which all the exposed sections of the substrates are firmly welded to the pressing plate, without enlarging the exposed margins of the substrates.

According to the second embodiment of the present invention, a section having an inside surface of a metal fitting of a current collecting body having an inverted L-shaped cross-section is placed so as to abut one of the opposing surfaces of a pressing plate and a folded back section, and abut one of the opposing surfaces of the pressing plate of the inverted L-shaped metal fitting welded by a high energy beam from a transverse direction. This enhances the fixing strength of the inverted L-shaped metal fitting, enables a section to be used which is wider than the folded back section of the pressing plate as a connecting section extended directly from the inverted L-shaped metal fitting, whereby a battery can be obtained which can produce a large current.

According to the third embodiment of the present invention, a section abutted to one of the opposing surfaces of a pressing plate of a metal fitting having an inverted L-shaped cross-section is provided with a slit at a position overlapping with a slit provided to the pressing plate. This enables the welding of at least one of the plurality of exposed sections of the positive electrode substrates and the negative electrode substrates, the pressing plate, and the pressing plate of the inverted L-shaped metal fitting through the respective slits at the same time, thereby enabling a metal terminal to be mounted to the pressing plate without increasing man-hours.

According to the foruth embodiment of the present invention, a laser beam and an electron beam are both conventionally used as high energy beams for welding, thereby enabling a reliable and high-quality prismatic battery to be obtained.

According to the fifth embodiment of the present invention, even if an electrode group becomes thicker and the number of exposed sections of the positive electrode substrates or negative electrode substrates inserted into a space between opposing surfaces of a current collecting body increases, when the plurality of exposed sections of substrates are divided into two pairs, the respective exposed sections become equivalent to that of an electrode group with a thinner thickness. Therefore, even without enlarging these exposed margins of substrates in particular, the pair of the exposed sections, a pressing plate, and a current collecting body can be integrally welded by a high energy beam from a transverse direction from both sides through slits provided at both sides of the opposing surfaces of the current collecting body. This enables the same advantage to be obtained as that of the invention according to the first embodiment and enables a prismatic battery to be obtained which can produce a larger current.

According to the sixth embodiment of the present invention, when two pairs of a plurality of exposed sections and a pressing plate are inserted into a space between opposing surfaces of a current collecting body by elastic force between the opposing surfaces of the pressing plate, a pressing force against a corresponding surface of the current collecting body can be applied to the pairs of the exposed sections. This enables the fixing of the pairs of the exposed sections, pressing plate and the current collecting body to be integrally fixed before welding, whereby stable welding can be performed by a high energy beam.

According to the seventh embodiment of the present invention, in addition to the advantages of the sixth embodiment a prismatic battery which can offer similar advantages to the present invention according to the fourth embodiment can be obtained.

According to the eighth embodiment of the present invention, even if the electrode group becomes thicker and the number of exposed sections of the positive electrode substrates or negative electrode substrates inserted into a gap of a pressing plate increases, the respective groups of exposed sections become equivalent to that of an electrode group with a thinner thickness, when the plurality of exposed sections are divided into two pairs. Therefore, even without enlarging these exposed margins of substrates in particular, in a state that each pair of the exposed sections is inserted into a gap between the two pressing sections of a pressing plate, the pairs of the exposed sections, the pressing plate, and the respective opposing surfaces of the current collecting body can be integrally welded by a high energy beam from a transverse direction, through respective slits provided to the opposing surfaces of the current collecting body and slits provided respectively to surfaces positioned outside of the pressing plate therebetween. This enables the same advantages to be obtained as those of the present invention according to the first embodiment, thereby enabling a prismatic battery to be obtained which is able to produce a large current.

According to the ninth embodiment of the present invention, in addition to the advantages of the eighth embodiment, a prismatic battery which can offer similar advantages to the present invention according to the fourth embodiment can be obtained.

BRIEF DESCRIPTION OF THE DRAWINGS

FIG. 1A is a perspective view of a state wherein a pressing plate is mounted to a rolled electrode group in a flat form, and FIG. 1B is a cross-sectional view of FIG. 1A taken along a line IB-IB.

FIG. 2A is a state wherein a current collecting body not having a further slit is mounted on the pressing plate mounted to the electrode group in a flat form of FIG. 1A, and FIG. 2B is a state wherein a current collecting body having a slit is mounted, and both are cross-sections corresponding to the cross-section of FIG. 1A taken along a line IB-IB, respectively.

FIG. 4A is a perspective view in a state wherein a current collecting body is mounted to a rolled electrode group in a flat form of the prismatic battery of the second embodiment, and FIG. 4B is a cross-sectional view of FIG. 4A taken along a line IVB-IVB.

FIG. 6A is a perspective view of a state wherein a current collecting body is mounted to a rolled electrode group in a flat form of the prismatic battery in the comparative example, and FIG. 6B is a cross-sectional view of FIG. 6A taken along a line VIB-VIB.

FIG. 13A is an enlarged cross-sectional view showing an actual disposing state of substrates within the current collecting body of FIG. 9, and FIG. 13B is an enlarged cross-sectional view when the a height of a pinching section of FIG. 13A is made higher.

DESCRIPTION OF THE PREFERRED EMBODIMENTS

Figure 3:
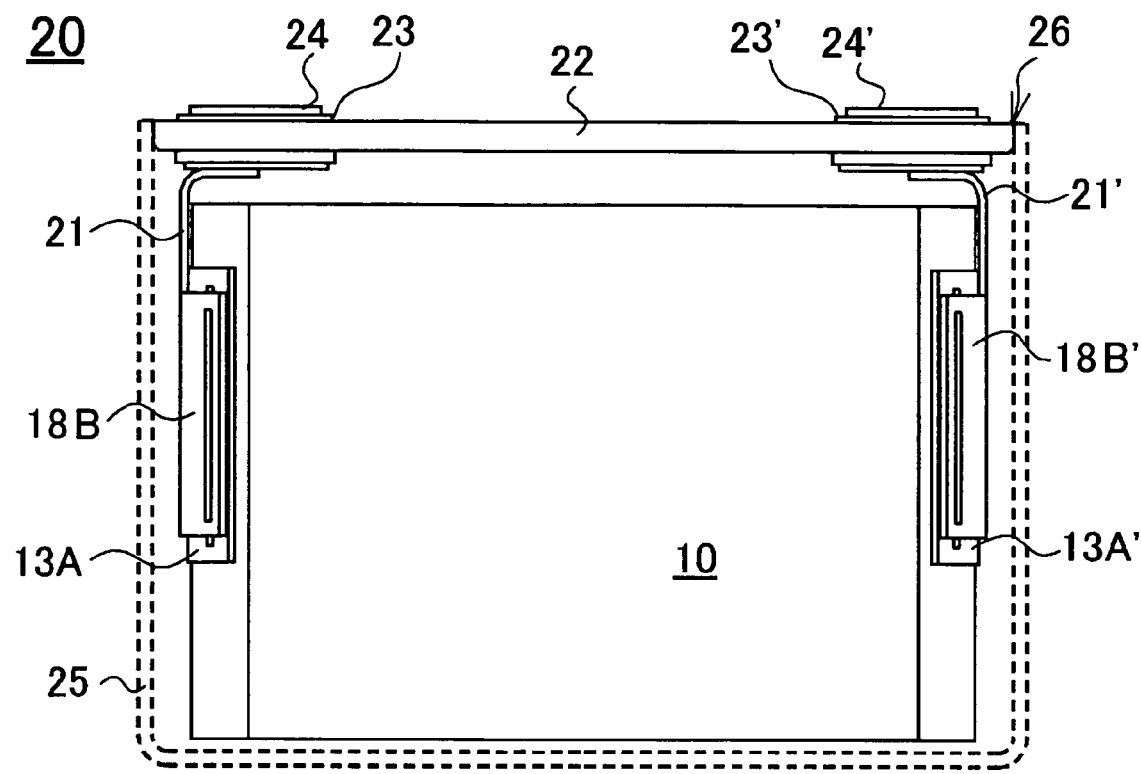
FIG. 3 is a partial cross-sectional view of a prismatic battery of the first embodiment wherein an electrode group in a flat form mounted with the current collecting body having a slit as shown in FIG. 2B is incorporated into a battery package.

Embodiments of the present invention will now be described below, taking a prismatic battery using a rolled electrode group in a flat form as an example, using embodiments and a comparative example with reference to the accompanying drawings. However, the following embodiments are one example of a prismatic battery using a rolled electrode group in a flat form to substantiate the art of the present invention. The invention is not intended to be specified by the embodiment. The present invention may equally apply to various modifications not departing from the spirit and scope of the appended claims, such as a stacked electrode group stacking a positive electrode plate and a negative electrode plate in a plurality with respective separators therebetween. The expression, "from a transverse direction" in the present invention refers to the irradiation direction of a high energy beam including not only an absolute horizontal but also a range considered to be transverse even if it is tilted to some extent from the horizontal direction. This tilt is not critical in any way, and concretely speaking, may be within an approximate range of ±30° taking the absolute horizontal direction as the criterion.

First, a manufacturing method of a rolled electrode group in a flat form used for embodiments and a comparative example will be described.

Manufacturing a Positive Electrode

A positive electrode was manufactured as follows. First, 94% by mass of a positive electrode active material consisting of lithium cobalt oxide, 3% by mass of carbon powder such as acetylene black and graphite, and 3% by mass of a binder made of polyvinylindene-fluoride (PVdF) were mixed together, whereby the resultant mixture was charged with N-metylpyrrolidone. This product was kneaded, to thereby produce an active material mixture slurry. A positive electrode plate coated with an active material layer was formed by uniformly coating the active material mixture slurry to one side of a positive electrode substrate made of aluminum foil having a thickness of 20 μm, making an exposed section of the aluminum foil at an end potion of an electrode. After this, the organic solvent needed for manufacturing the slurry was removed, and the resultant product was dried by passing the positive electrode plate coated with the active material layer through a drying machine. After drying, the dried positive electrode plate was rolled by a roll press machine and made into a positive electrode plate having a thickness of 0.06 mm. The thus-produced electrode was cut out in a rectangle having a width of 96 mm, to thereby obtain a positive electrode provided with a strip of aluminum foil exposed section having a width of 10 mm.

Manufacturing a Negative Electrode

A negative electrode was manufactured as follows. First, 98% by mass of a graphite powder, 1% by mass of carboxymethyl cellulose and styrene-butadiene rubber, respectively, were mixed together. Water was added to the resultant mixture, which was then kneaded to produce a slurry. A negative electrode plate coated with a negative electrode active material layer was obtained by uniformly coating the slurry to one side of negative electrode substrates made of a copper foil having a thickness of 12 μm, making an exposed section of the copper foil at an end of an electrode. After this, a water needed for manufacturing the slurry was removed and dried by passing the negative electrode plate coated with the active material layer through a drying machine. After drying, the dried negative electrode plate was rolled by a roll press machine, and made into a negative electrode plate having a thickness of 0.05 mm. Next, the obtained electrode was cut out in a rectangle having a width of 98 mm, to thereby obtain a negative electrode provided with a strip of copper foil exposed section having a width of 8 mm.

Manufacturing a Rolled Electrode Group in a Flat Form

The thus-obtained positive electrode plate aluminum foil exposed section and the negative electrode plate copper foil exposed section were shifted so that they did not overlap with respective opposing active material layers of the electrode, and were then rolled through a polyethylene porous separator having a thickness of 0.022 mm, to thereby produce a rolled electrode group 10 in a flat form respectively formed with a plurality of aluminum foil exposed sections and a plurality of copper foil exposed sections at both ends, which are to be used for embodiments and a comparative example.

First Embodiment

A prismatic battery of the first embodiment will be described with reference to FIGS. 1A through 3. FIG. 1A is a perspective view of a state wherein a pressing plate is mounted to a rolled electrode group in a flat form, and FIG. 1B is a cross-sectional view of FIG. 1A taken along a line IB-IB. FIG. 2A is a state wherein a current collecting body not having a further slit is mounted on the pressing plate mounted to the electrode group in a flat form of FIG. 1A, and FIG. 2B are also a state wherein a current collecting body having a slit is mounted, and are cross-sectional view corresponding to the cross-sectional view of FIG. 1A taken along a line IB-IB, respectively. FIG. 3 is a partial cross-sectional view of a prismatic battery of the first embodiment wherein an electrode group in a flat form is mounted with the current collecting body having a slit shown in FIG. 2B incorporated into a battery package.

The electrode group 10 in a flat form of the prismatic battery according to the first embodiment is mounted with a pressing plate 13A formed with surfaces 11A and 12A opposing to each other and spaced apart by folding back a metal plate at a folded back section 14. At least at one side of the surfaces 11A and 12A of the pressing plate 13A opposing to each other, a slit 15 is provided in parallel along the folded back section 14. A plurality of exposed sections 16 of positive substrates or negative substrates extended from the rolled electrode group 10 in a flat form are inserted into a gap of the pressing plate 13A, and integrally welded by irradiating laser beam from a transverse direction to the plurality of the exposed sections 16 of the positive substrates or the negative substrates, and the pressing plate 13A through a slit 15.

According to such features, fine particles sputtered during the welding by a laser beam irradiation, are dispersed in a traveling direction of the laser beam, in other words, in a horizontal direction. This reduces the possibility of internal short-circuit as they will not infiltrate the rolled electrode group 10 in a flat form. Further, in a case that welding energy of a laser beam is too great, the laser beam passes through the surface 11A opposing the surface 12A provided with a slit. Even this happen, there is only a slight chance of damage being caused to the rolled electrode group 10 in a flat form.

The plurality of exposed sections 16 of the positive electrode substrates or the negative electrode substrates inserted into a gap of the pressing plate 13A, as shown in FIG. 1B, have fixed exposed margins of substrates. As this results in a difference in the distance to the tip of the substrates corresponding to the thickness of the rolled electrode group 10 in a flat form, the center of the pressing plate extends to the highest position, and becomes shorter towards both ends. However, according to the pressing plate 13A adopted in the first embodiment, because the position that the slit 15 of the pressing plate 13A is provided is closer to a base of the exposed section 16 of the substrates compared to the related art, all the substrates of the exposed sections 16 and the pressing plate 13A can be welded even without enlarging the exposed margins of substrates.

The pressing plate 13A needs to be connected to an external output terminal provided in the battery package, which is not shown, by a current collecting body. Therefore, as a current collecting body 18A of the prismatic battery in the first embodiment, as shown in FIG. 2A, a body was used having a metal fitting having an inverted L-shaped cross-section and a connecting section (not shown) was directly extended in a strip form from the metal fitting. An inside surface of the current collecting body 18A was provided so as to abut one of the opposing surfaces of the pressing plate 13A and the folded back section 14, whereby a section abutting one of the opposing surfaces of the pressing plate 13A of the inverted L-shaped metal fitting could be welded separately from a reverse direction to the direction that the slit 15 of the pressing plate 13A, and from a transverse direction by laser beam.

According to such a current collecting body 18A of the prismatic battery of the first embodiment, the number of laser welding process increases by one, as the current collecting body 18A needs to be welded to the pressing plate 13A. But because the width of the connecting section directly extended in a strip form from the inverted L-shaped metal fitting can be sufficiently widened more than the width of the folded back section 14 of the pressing plate 13A, a battery which can produce large current can be obtained.

The folded back section of the inverted L-shaped metal fitting of the current collecting body 18A is not necessary folded back at a right angle, but as the folded back section shown by reference character $18A_1$, may be in an inverted L shape with a swelled curve. By having such feature, even if an error is made to the shapes of the current collecting body 18A and the pressing plate 13A, mounting and fixing the current collecting body 18A becomes easy. Also, a skirt section $13A_1$ spreading above a plurality of exposed sections 16 of the positive electrode substrates or negative electrode substrates may be provided at a bottom end of the pressing plate 13A. By adopting such features, the pressing 13A will not move easily, meaning that even if the battery receives vibration or the like, contact resistance between the pressing plate 13A and the plurality of exposed sections 16 of the positive electrode substrates or the negative electrode substrates seldom increases.

As a modification of the current collecting body of the prismatic battery of the first embodiment, a current collecting body 18B having a slit may be adopted, as shown in FIG. 2B. The current collecting body 18B shown in FIG. 2B is provided with a metal fitting having an inverted L-shaped cross-section and a connecting section 21 (refer to FIG. 3) directly extended in a strip form from the metal fitting, as well as a slit 15'. The modification is similar to the current collecting body 18A, except for laser welding by arranging the slit 15' of the current collecting body 18B and the slit 15 of the pressing plate 13A being overlapped, but requires only one laser welding process. Once again, in the modification of the first embodiment, as the folded back section shown by reference numeral $18B_1$, a folded back section of the inverted L-shaped metal fitting of the current collecting body 18B may be in an inverted L shape with a swelled curve. Further, a skirt section $13A_1$ spreading above the plurality of the exposed sections 16 of the positive electrode substrates or the negative electrode substrates may be provided at a bottom end of the pressing plate 13A, and a skirt section $18B_2$ may be provided at a bottom end of the inverted L-shaped metal fitting.

FIG. 3 shows a partial cross-sectional view of a prismatic battery 20 adopting the current collection body 18B in the modification of the first embodiment shown in FIG. 2B. The prismatic battery 20 is mounted with, for example, a pressing plate 13A at a positive electrode side of a rolled electrode group 10 in a flat form, and the current collecting body 18B with features shown in FIG. 2B is mounted to the pressing plate 13A, and a connecting section 21 of the current collecting body 18B is connected to a positive electrode external terminal 24 mounted to a sealing plate 22 interposing an insulating material 23 therebetween. In a similar way, a pressing plate 13A' is mounted at a negative electrode side of a rolled electrode group 10 in a flat form, a current collecting body 18B' is mounted to the pressing plate 13A', and a connecting section 21' of the current collecting body 18B' is connected to a negative electrode external terminal 24' mounted to a sealing plate 22 interposing an insulating material 23' therebetween.

The prismatic battery 20 is completed by, inserting the rolled electrode group 10 integrated with the sealing plate 22 into a battery package 25, laser welding a surrounding of the sealing plate 22 and a connection section 26 of the battery package 25, and sealing an electrolyte injection hole after injecting a set amount of a set composition of electrolyte from the electrolyte injection hole, which is not shown. Further, as an electrolyte solution, non-aqueous electrolyte and the like in which 1 mol/L of $LiPF_6$ was dissolved in a mixed solvent with a volume ratio of 3:7 of ethylene carbonate and diethyl carbonate may be used. The prismatic battery 20 obtained in such a way has a very large contact area between the plurality of exposed sections 16 of the positive electrode substrates and the pressing plate 13A, and exposed sections 16 of the negative electrode substrates and the pressing plate 13A'. Furthermore, resistance between the pressing plate 13A and current collecting body 18B, and pressing plate 13A' and current collecting body 18B', and between the current collecting body 18B and the positive electrode external terminal 24, and current collecting body 18B' and the negative electrode external terminal 24' is low, which is optimum for batteries for EVs and HEVs which need large current.

Second Embodiment

If the rolled electrode group 10 in a flat form becomes thicker, the number of the exposed sections 16 of the positive electrode substrates or the negative electrode substrates inserted into a gap of the pressing plate 13A increases in the features of the pressing plate 13A as shown in the first embodiment, giving rise to the possibility that not all of the exposed sections 16 will fit into the gap of the pressing plate 13A unless an exposed margin is enlarged. Therefore, the features of a prismatic battery mounting a current collecting body to a thick rolled electrode group in a flat form are described as the second embodiment, with reference to FIGS. 4A and 4B. FIG. 4A is a perspective view in a state wherein a current collecting body is mounted to a rolled electrode group in a flat form of a prismatic battery of the second embodiment, and FIG. 4B is a cross-sectional view of FIG. 4A taken along a line IVB-IVB. In FIGS. 4A and 4B, the same reference numerals are given to describe the same component parts of current collecting structures of the prismatic battery in the first embodiment.

An electrode group 10 in a flat form of the prismatic battery of the second embodiment is provided with a current collecting body 18C, in a bracket shape, formed with surfaces $18C_3$ and $18C_4$ opposing each other and spaced apart by a space W1 by folding back a metal plate at two folded back sections $18C_1$ and $18C_2$ spaced apart. The current collecting body 18C is provided with slits $15_1'$ and $15_2'$ in parallel along folded back sections $18C_1$ and $18C_2$, at both sides of surfaces $18C_3$ and $18C_4$ opposing each other. Plural exposed sections 16 of the positive electrode substrates or negative electrode substrates extended from the rolled electrode group 10 in a flat form are divided and bundled into two pairs at a flat section, respectively made into a first exposed section $16_1$ and a second exposed section $16_2$. A pressing plate 13C is disposed between the first exposed section $16_1$ and the second exposed section $16_2$, and as shown in FIG. 4B, the first exposed section $16_1$, the second exposed section $16_2$, and the pressing plate 13C are inserted at the same time between the surfaces $18C_3$ and $18C_4$ of the current collecting body 18C opposing to each other.

A horizontal width W2 of the pressing plate 13C may satisfy the relationship of difference between a space W1 of surfaces $18C_3$ and $18C_4$ of the current collecting body 18C opposing each other, and a sum W3 of a width of the first exposed section $16_1$ and a width of the second exposed section $16_2$ of at least one of the positive electrode substrates and the negative electrode substrates, in other words, W2=W1−W3, and its shape is arbitrary. However, to make the first exposed section $16_1$ and the second exposed section $16_2$ of the positive electrode substrates or the negative electrode substrates to be pushed toward a side of surfaces $18C_3$ and $18C_4$ of the current collecting body 18C opposing each other by the pressing plate 13C, as shown in FIG. 4B, the following elements are formed. The pressing plate 13C with surfaces opposing to each other and spaced apart by folding back a metal plate, and a gap between the surfaces of the pressing plate 13C opposing to each other are formed. As a result, these surfaces can be displaced and exert an elastic force.

In such a way, the first exposed section $16_1$ and the pressing plate 13C, and the pressing plate 13C and the second exposed section $16_2$ can be integrally welded by irradiating a laser beam from both sides, through two slits $15_1'$ and $15_2'$ provided at the respective surfaces $18C_3$ and $18C_4$ of the current collecting body 18C opposing each other therebetween. The prismatic battery according to the second embodiment can obtain the similar result to the prismatic battery 20 in the first embodiment, thereby enabling a large prismatic battery to be obtained which can produce a large current.

Third Embodiment

Figure 5:
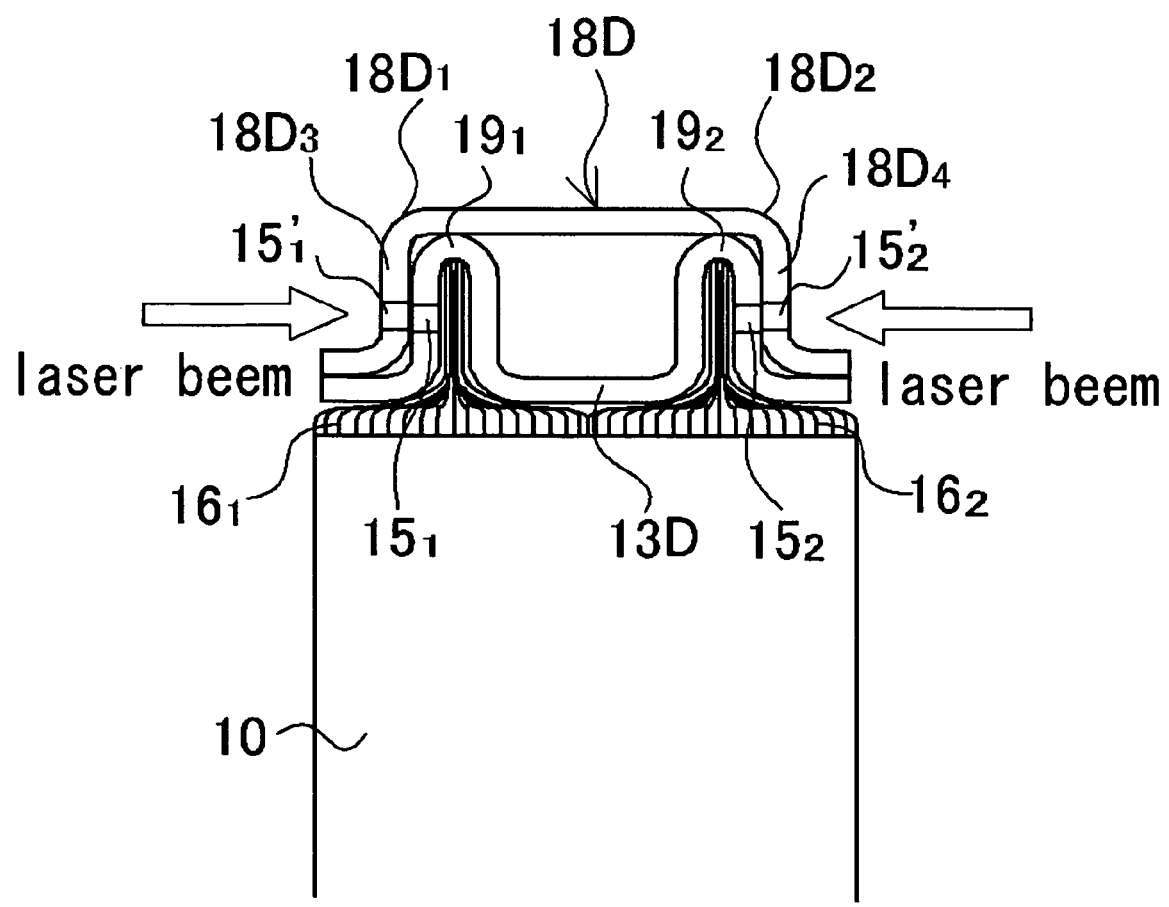
FIG. 5 is a cross-sectional view showing a state wherein a current collecting body is mounted to a rolled electrode group in a flat form of the prismatic battery of the third embodiment, corresponding to the cross-sectional view of FIG. 4A taken along a line IVB-IVB.
Figure 7:
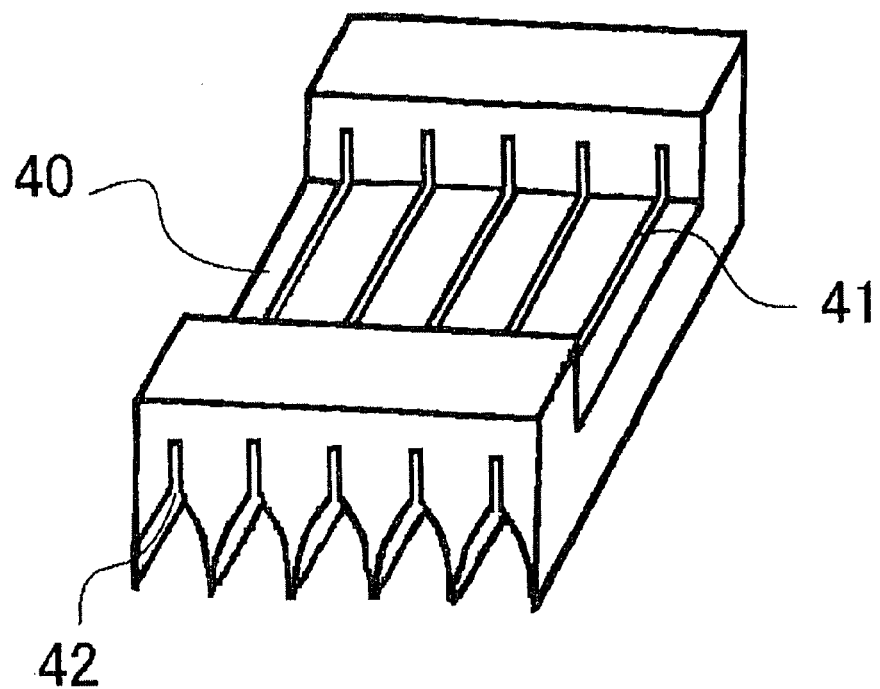
FIG. 7 is a perspective view of a current collecting body of a battery of related art.
Figure 8:
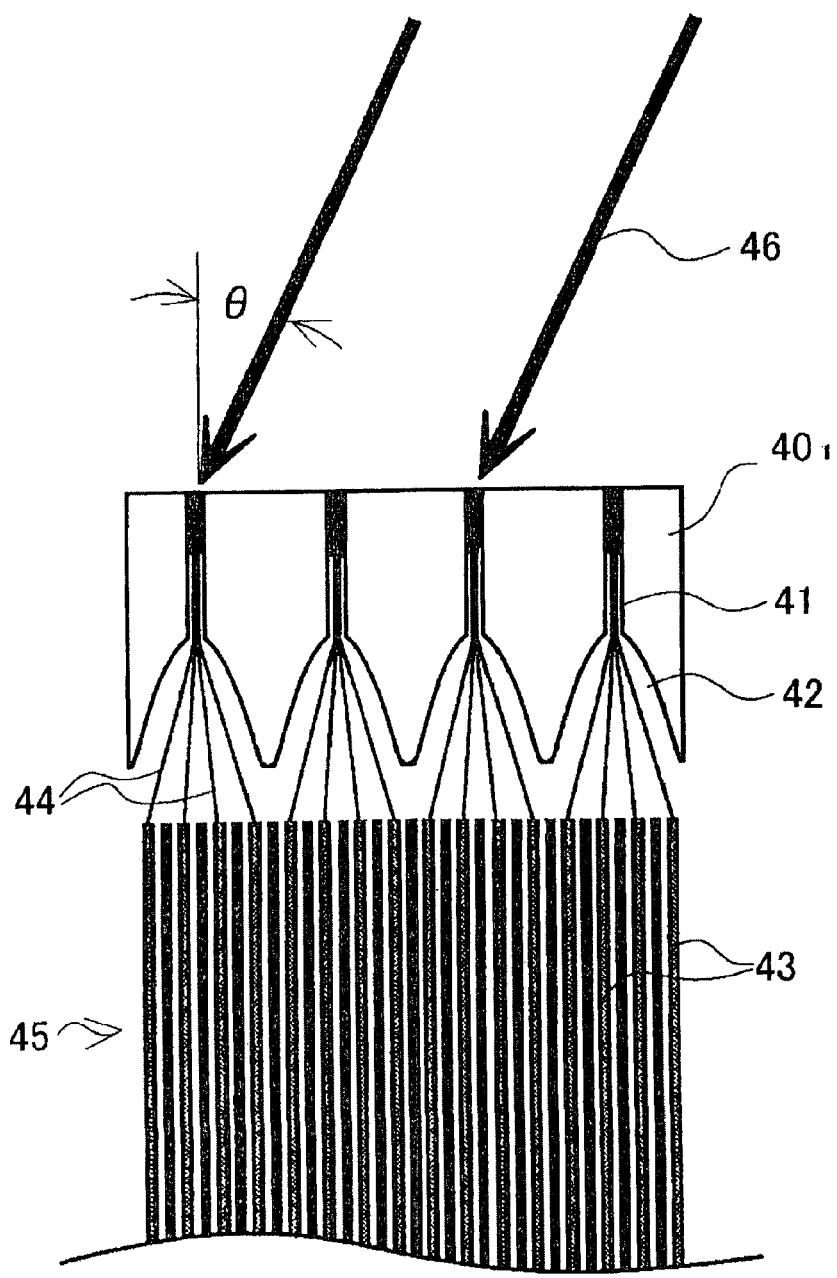
FIG. 8 is a schematic plan view during laser welding after a current collecting body is mounted to an edge of substrates at an uncoated side of the current collecting body of FIG. 7.
Figure 9:
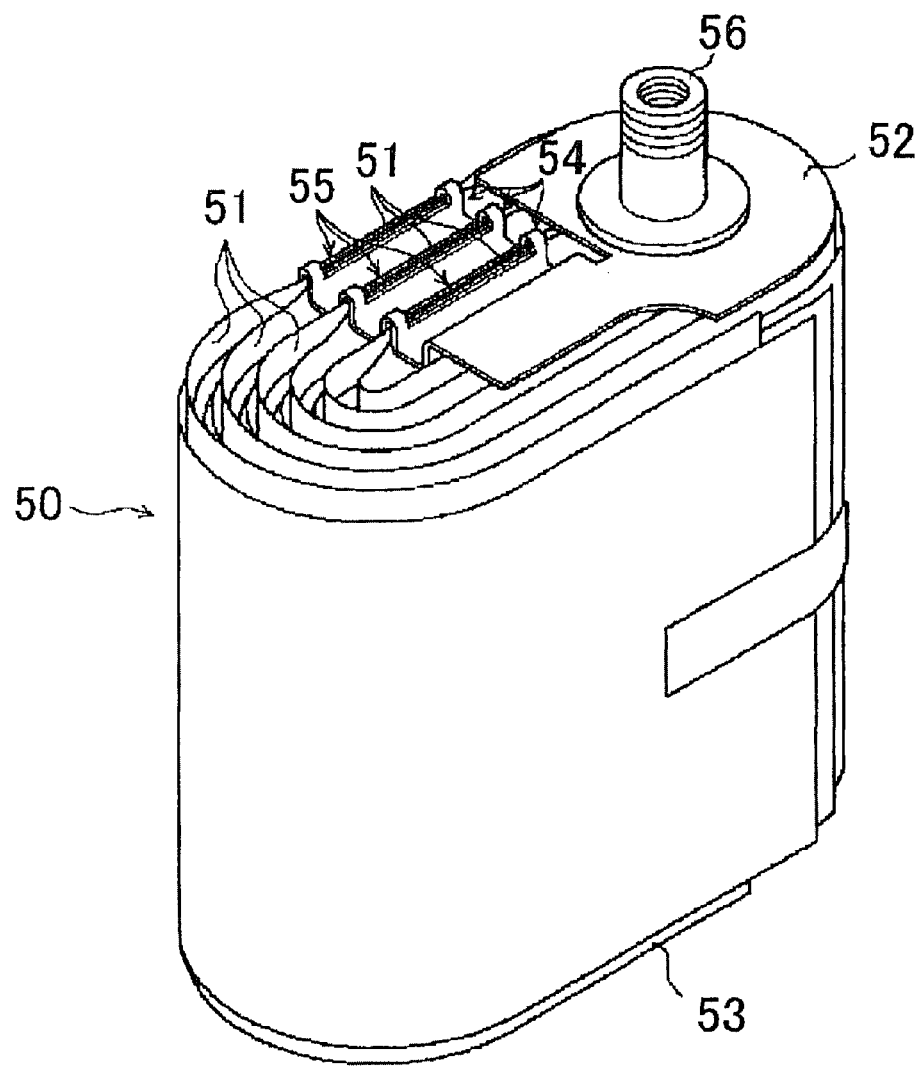
FIG. 9 is a perspective view showing a state wherein a current collecting body is mounted to a rolled electrode of a battery of other related art.
Figure 10:
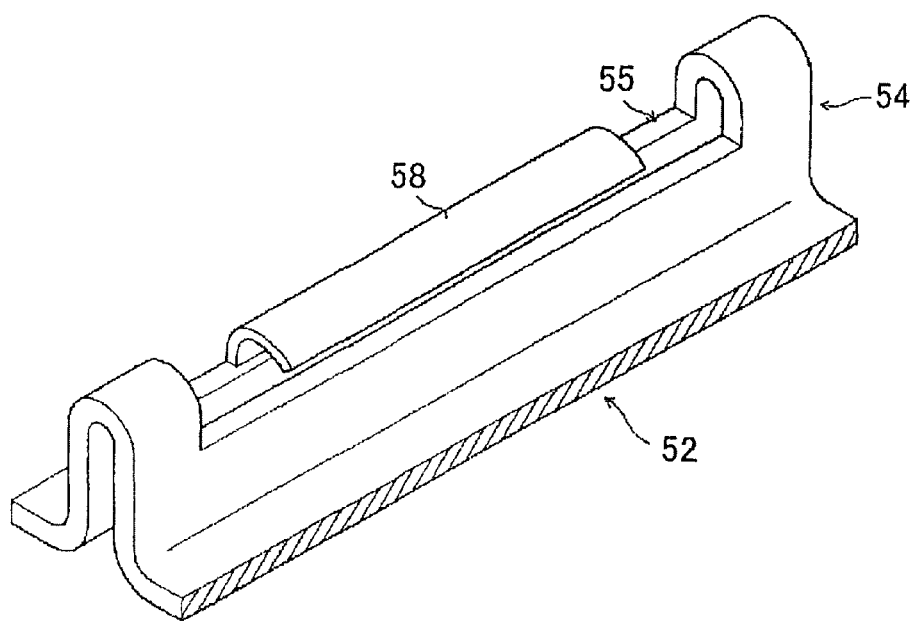
FIG. 10 is an enlarged partial perspective view of the current collecting body of FIG. 9.
Figure 11:
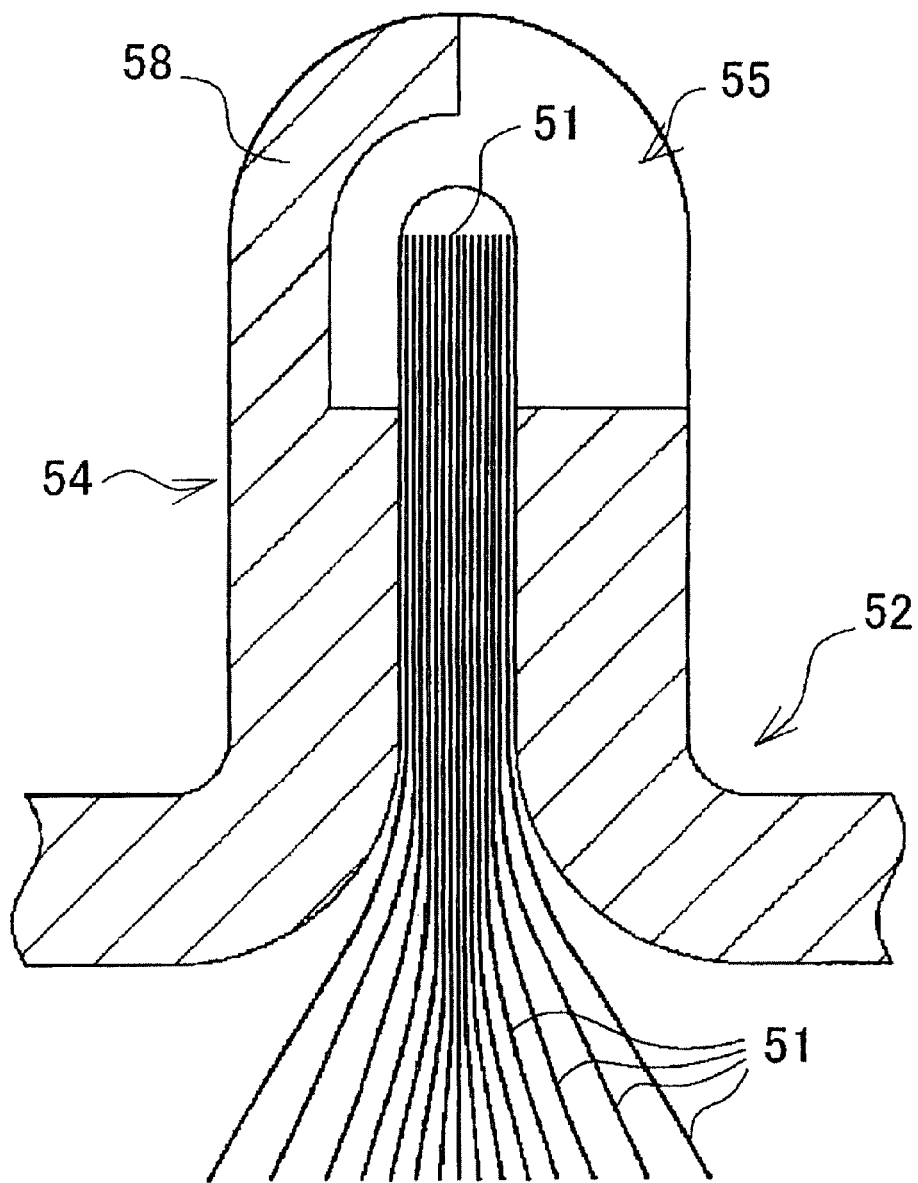
FIG. 11 is an enlarged cross-sectional view before bending an edge of substrates at an uncoated side of an electrode inserted in a slit of the current collecting body of FIG. 9.
Figure 12:
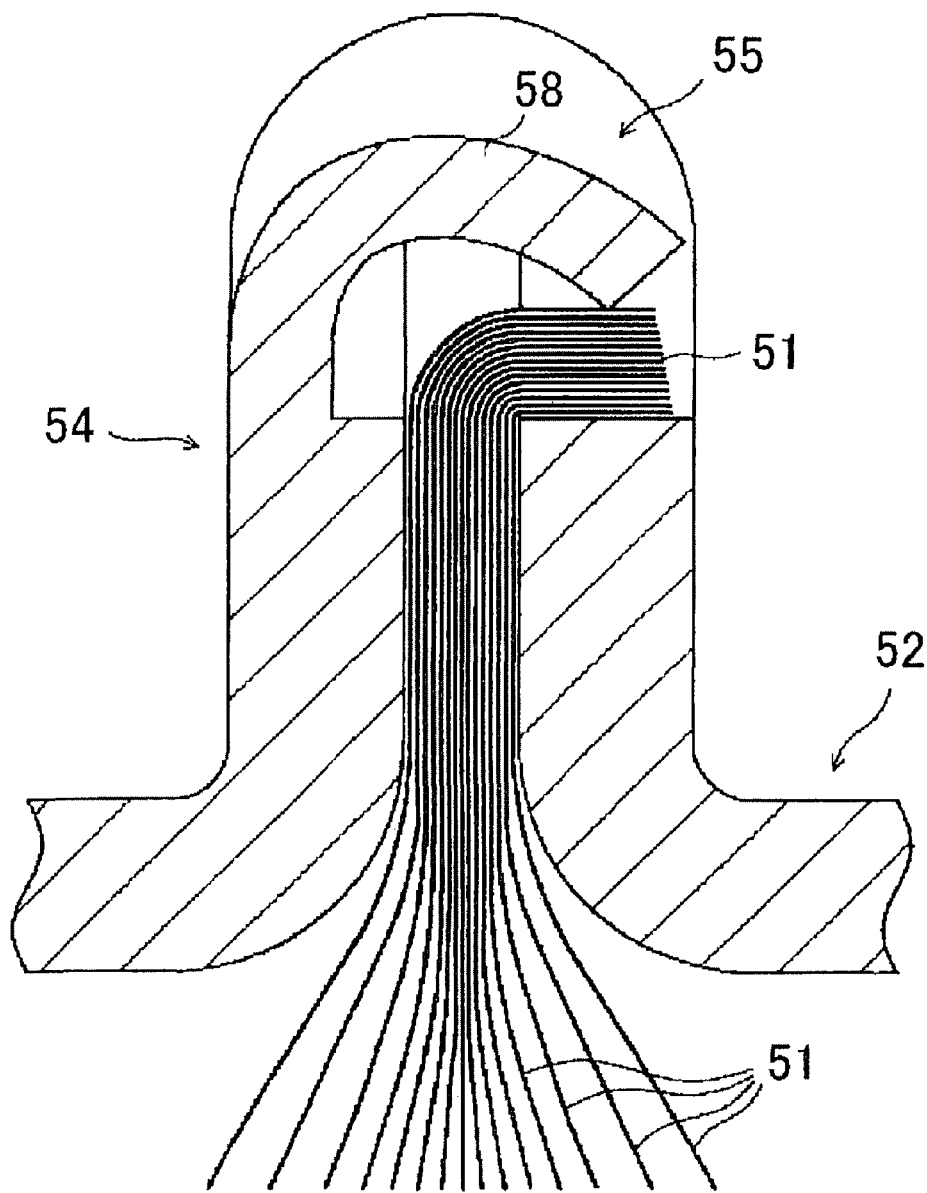
FIG. 12 is an enlarged cross-sectional view after bending an edge of substrates at an uncoated side of an electrode inserted into a slit of the current collecting body of FIG. 9.

A prismatic battery of the third embodiment applies to a thick rolled electrode group 10 in a flat form, as in the case of the second embodiment, but which integrally combines s similar features to the pressing plate 13A of the prismatic battery in the first embodiment that was used as a pressing plate. Features of a current collecting body mounted to a rolled electrode group in a flat form of a prismatic battery in the third embodiment shall be described with reference to FIG. 5. FIG. 5 is a cross-section showing a state wherein a current collecting body is mounted to a rolled electrode group in a flat form of a prismatic battery in the third embodiment, and corresponding to the cross-sectional view of FIG. 4A taken along a line IVB-IVB. The same reference numerals are given and described to the same component parts of the current collecting body 18C of the prismatic battery in the second embodiment.

The electrode group 10 in a flat form of the prismatic battery in the third embodiment is mounted with a current collecting body 18D, in bracket shapes, formed with surfaces $18D_3$ and $18D_4$, opposing each other and spaced apart by folding back a metal plate at two folded back sections $18D_1$ and $18D_2$ spaced apart. The current collecting body 18D is provided with slits $15_1'$ and $15_2'$ in parallel along the folded back sections $18D_1$ and $18D_2$, at both sides of the surfaces $18D_3$ and $18D_4$ opposing to each other. Plural exposed sections 16 of positive electrode substrates or negative electrode substrates extended from a rolled electrode group 10 in a flat form are divided and bundled into two pairs at a flat section, which are respectively made into a first exposed section $16_1$ and a second exposed section $16_2$.

Also as a pressing plate 13D, two pressing sections $19_1$ and $19_2$, formed with surfaces opposing to each other and spaced apart by folding back a metal plate are integrally formed in parallel and spaced with a predetermined gap therebetween, and also provided with slits $15_1$ and $15_2$ along the respective folded back sections at surfaces positioned outside of two pressing sections $19_1$ and $19_2$. The first exposed section $16_1$ and the second exposed section $16_2$ are disposed within a gap of the two pressing sections $19_1$ and $19_2$ of the pressing plate 13D, and inserted the first exposed section $16_1$, the second exposed section $16_2$ and the pressing plate 13D between the surfaces $18D_3$ and $18D_4$ of the current collecting body 18D opposing each other at the same time, as shown in FIG. 5.

In this way, the first exposed section $16_1$ and the pressing section $19_1$ which is one of the pressing plates 13D, and the pressing section $19_2$ which is the other pressing plate 13D and the second exposed section $16_2$, are integrally welded by irradiating laser beam from both sides through two slits $15_1'$ and $15_2'$ provided at surfaces $18D_3$ and $18D_4$ opposing each other and two slits $15_1$ and $15_2$ provided at a surface placed outside of two pressing sections $19_1$ and $19_2$ of respective current collecting bodies 18D therebetween. The prismatic battery according to the third embodiment can obtain the similar result as the prismatic battery according to the second embodiment.

First Comparative Example

In a prismatic battery according to a comparative example, a laser welding method was used for welding between an exposed section of positive electrode substrates or negative electrode substrates and a current collecting body, but unlike the first to third embodiments, laser beam was irradiated from a vertical direction towards the exposed section of the positive electrode substrates or the negative electrode substrates. A state in which a current collecting body was mounted to a rolled electrode group in a flat form of the prismatic battery in the comparative example shall be described with reference to FIG. 6. FIG. 6A is a perspective view of a current collecting body mounted to a rolled electrode group in a flat form of a prismatic battery in a comparative example, and FIG. 6B is a cross-sectional view of FIG. 6A taken along a line VIB-VIB.

The current collecting body 18E used for the prismatic battery in the comparative example was formed with surfaces $18E_3$ and $18E_4$ opposing each other and spaced apart by folding back a metal plate in a bracket shape, and a surface connecting between the surfaces $18E_3$ and $18E_4$ opposing each other, and formed with a connecting section 21 directly extended in a strip form from a surface connecting between the surfaces $18E_3$ and $18E_4$ opposing each other. Further, the current collecting body 18E was not provided with a slit. By inserting all exposed sections 16 of positive electrode substrates or negative electrode substrates between surfaces $18E_3$ and $18E_4$ of the current collecting body 18E opposing each other, the exposed sections 16 of the positive electrode substrates or the negative electrode substrates and the current collecting body 18E were laser welded by irradiating laser beam from the current collecting body 18E side. No problems occurred when the laser beam did not go through the current collecting body 18E, but when the laser beam did go through the current collecting body 18E, short-circuit was occurred as the laser beam infiltrated the rolled electrode group 10 in a flat form.

Further, in the first to third embodiments stated above, a laser welding method was used as a welding method, but it is not limited to this, and may use a known high energy beam, such as an electron beam welding method.

The invention claimed is:

1. A prismatic battery, comprising:
    an electrode group in a flat form stacked or rolled by a positive electrode coated with a positive electrode mixture to a positive electrode substrate and a negative electrode coated with a negative electrode mixture to a negative substrate with respect to each other with a separator therebetween;
    a pressing plate; and
    a current collecting body electrically connected to said pressing plate;
    an end in a width direction of at least one of said positive electrode substrate and said negative electrode substrate having a plurality of exposed sections which are uncoated with said positive electrode mixture and said negative electrode mixture, and said pressing plate welded to said plurality of exposed sections;
    said pressing plate forming opposing surfaces with a gap therebetween by folding back a metal plate, and provided with a slit along a folded back section at least to one side of said opposing surfaces;
    said plurality of exposed sections being inserted into said gap of said pressing plate, and said plurality of exposed sections and said pressing plate are being welded by a high energy beam from a transverse direction through said slit;
    wherein said current collecting body includes a metal fitting having an inverted L-shaped cross section and a connecting section directly extended in a strip form from said metal fitting;
    said current collecting body having an inside surface of said inverted L-shaped metal fitting positioned so as to abut to one of said opposing surfaces of said pressing plate, and said folded back section; and
    said current collecting body having a section abutting one of said opposing surfaces of said pressing plate of said inverted L-shaped metal fitting welded by a high energy beam from a transverse direction;
    wherein said current collecting body having a section abutting one of said opposing surfaces of said pressing plate of said inverted L-shaped metal fitting is provided with a slit at a position overlapping with another slit provided at said pressing plate; and
    said plurality of exposed sections, said pressing plate and said inverted L-shaped metal fitting of said current collecting body are welded by a high energy beam from a transverse direction through said respective slits provided to said pressing plate and said inverted L-shaped metal fitting of said current collecting body.

* * * * *